W. ALEXANDER.
PROCESS OF EXTRACTING OIL FROM COCOANUTS.
APPLICATION FILED OCT. 17, 1918.
1,366,338. Patented Jan. 25, 1921.
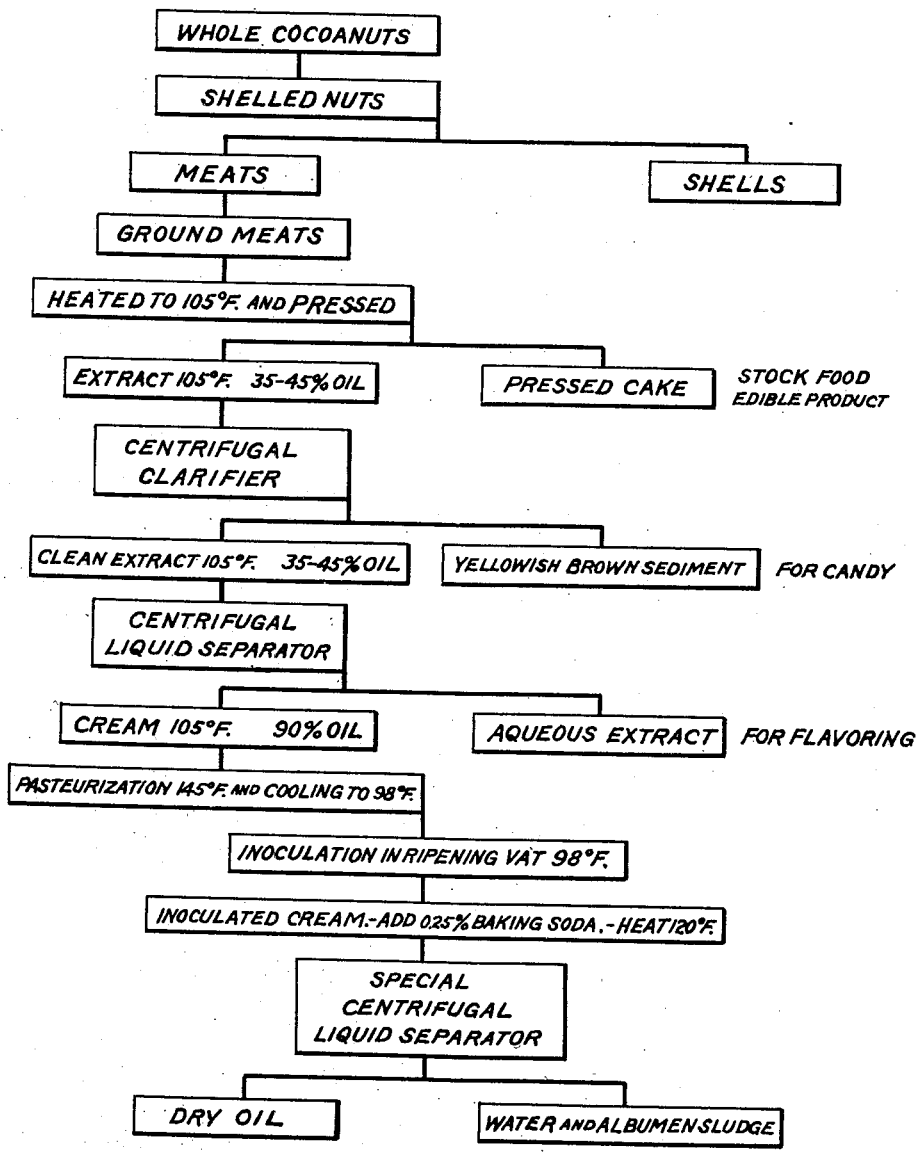

UNITED STATES PATENT OFFICE.

WALLACE ALEXANDER, OF JERSEY CITY, NEW JERSEY, ASSIGNOR TO THE DE LAVAL SEPARATOR COMPANY, OF NEW YORK, N. Y., A CORPORATION OF NEW JERSEY.

PROCESS OF EXTRACTING OIL FROM COCOANUTS.

1,366,338.   Specification of Letters Patent.   Patented Jan. 25, 1921.

Application filed October 17, 1918. Serial No. 258,543.

*To all whom it may concern:*

Be it known that I, WALLACE ALEXANDER, a citizen of the United States, residing at Jersey City, county of Hudson, and State of New Jersey, have invented a new and useful Improvement in Processes of Extracting Oil from Cocoanuts, of which the following is a full, clear, and exact description, reference being had to the accompanying drawings, which form a part of this specification.

The object of my invention is to extract pure dry oil from the meats of fresh cocoanuts and specifically to do this without the employment of an expensive high power press.

After the shells are steamed to loosen the meats therefrom, only one method has been heretofore available to produce a clear oil. In this method the meats are dried to a moisture content of 3 to 8 per cent. and pressed in a high power press. If the meats are only partially dried and are pressed in a low power press, there is produced a milky emulsion or aqueous extract.

In my process I obtain a clear dry oil without employing a high power press and recover, during the process, various by-products of considerable value.

The drawing, while not essential to an understanding of the invention, illustrates diagrammatically every step of the process, so that it may be readily apprehended, by those skilled in the art, without careful study of the description.

The shells are first separated from the meats by any convenient process.

The meats, separated from the shells, are ground, and if desired pared. They are mildly heated, say to preferably about 105 degrees F. (or about 40 degrees C.), but not to exceed 150° F. No water is added, and there is no drying, or loss of moisture, except that incidental to the mild temperature to which they are exposed. Heating to about this degree is necessary to keep the oil melted and flowing freely from the press. The press may be any low power press of approved standard. The extract will contain from 35 to 45 per cent. oil. The pressed cake retains a small percentage of the oil and is an edible product, being available, for example, as a stock food.

I prefer to run the oil through a centrifugal clarifier. The yellowish brown sediment thereby removed is adapted for various uses, and commands a market among the manufacturers of candy. This step may be omitted.

The cleaned extract is then passed through a centrifugal separator. Any efficient cream separator may be employed, but I prefer to use a separator of the type shown in the Snyder Patent No. 1,283,343, dated October 29, 1918. The centrifugal action separates the extract into two parts. One is an aqueous portion that contains nearly all of the cocoanut flavor with only a trace of oil. It is available for use in flavoring food products. The other portion is a creamy emulsion of albumin and oil, the oil content being from 85 to 90 per cent.

During the above separation, the temperature is preferably maintained at about the temperature hereinbefore mentioned.

The creamy emulsion is now pasteurized. The temperature of pasteurization should be about 63° C. (or about 145° F.) followed by cooling to about 36° C. (or about 98° F.). The pasteurized cream is run into a cream ripening vat and inoculated with a culture of bacteria capable of digesting, partially, at least, cocoanut albumin; the last named temperature being maintained. Any competent bacteriologist can furnish these bacteria, which are one of several kinds produced by the fermentation of the cream itself. By allowing a quantity of cream to stand over night, the bacteria that liquefy albumin may be isolated. The bacteria-inoculating process requires from five to ten hours, according to the method of handling.

At the end of this digestion, about .25 per cent. baking soda or other alkali such as caustic soda or sodium carbonate is added to neutralize the fatty acids and other organic acids and kill off the bacteria and also to partially dissolve albumin remaining in suspension. The cream is now passed through a special centrifugal separator adjusted to deliver dry oil. The ordinary cream separator is not available, but a separator and purifier constructed in accordance with the Snyder patent above named has been found efficient. The cocoanut oil obtained is free from albumin and dirt and contains only traces of fatty acids and moisture. The free fatty acids should not be above 0.1 per cent., calculated as oleic acid. The moisture should be within the same limit.

The heavier liquid ingredient separated out consists of water and albumin sludge.

The oil is refined by the usual methods.

The cream should be prepared as quickly as possible, because the extract ferments quite rapidly; but the cream, after separation from the extract, is fairly stable. It is also important, for the same reason, that as little water as possible should be used in the preparation of the extract.

The precise steps, in the exact sequence described, and at the stated temperatures, need not be strictly adhered to, in order to practise my process. My actual experience, however, indicates that by adhering quite closely to the specific procedure described, the best results will be obtained.

Further, certain of the sub-processes involve independent novelty and also exhibit utility, either alone or as the remainder of the process may be modified by those skilled in the art. Thus the described extraction of the liquid contents from the meats to leave a pressed cake, followed by the described separation of the larger part of the water to leave a creamy emulsion consisting mainly of oil, is of utility, even though the subsequent process of eliminating the water and contained albumin to separate out the dry oil may be substantially modified. For example, the aqueous flavoring extract has been described as a flavoring extract. One example of a use to which such an extract may be put is the flavoring of the pressed cake produced in the preparatory grinding, heating and pressing operation described; making an article of food fit for human consumption. Again, the creamy emulsion produced as described, followed by the bacteriological treatment described, is of novelty and utility even though the details of that treatment, including pasteurization and the addition of an alkali, may be modified.

I do not claim herein the process comprising pressing the undried meats, applying centrifugal force to separate from the extract a creamy emulsion containing a large percentage of oil and an aqueous flavoring extract, with or without subsequent treatment of the creamy emulsion to eliminate the larger part of the water and contained albumin, as such process is claimed in another application filed by me May 21, 1919, Serial No. 298,796.

Having now fully described my invention, what I claim and desire to protect by Letters Patent is:

1. In the art of extracting oil from the meats of cocoanuts and the like, the process which comprises extracting from the meats the liquid content, separating from the extract a creamy emulsion, inoculating the creamy emulsion with bacteria adapted to digest albumin, and separating the dry oil from the water and albumin sludge.

2. In the art of extracting oil from the meats of cocoanuts and the like, the process which comprises extracting from the meats the liquid content, separating from the extract a creamy emulsion, inoculating the creamy emulsion with bacteria adapted to digest albumin, neutralizing organic acids in the inoculated cream, and separating out the dry oil.

3. In the art of extracting oil from the meats of cocoanuts and the like, the process which comprises extracting the liquid content from the meats, separating from the extract a creamy emulsion, pasteurizing the cream, inoculating the cream with bacteria adapted to digest albumin, and separating the dry oil.

4. In the art of extracting oil from the meats of cocoanuts and the like, the process which comprises extracting the liquid content from the meats, separating from the extract a creamy emulsion, pasteurizing the cream, inoculating the cream with bacteria adapted to digest albumin, neutralizing organic acids in the inoculated cream, and separating out the dry oil.

5. In the art of extracting oil from the meats of cocoanuts and the like, the process which comprises extracting the liquid extract from the meats, subjecting the liquid extract to centrifugal force to separate out the larger part of the water and leave a creamy emulsion consisting mainly of oil, inoculating the cream with bacteria adapted to digest albumin, and subjecting the cream to the action of centrifugal force to separate out the dry oil.

6. In the art of extracting oil from the meats of cocoanuts and the like, the process which comprises extracting the liquid content from the meats, subjecting the liquid extract to centrifugal force to separate out a creamy oil-containing emulsion, pasteurizing the cream and inoculating it with bacteria adapted to digest albumin, and subjecting the cream to the action of centrifugal force to separate out the dry oil.

7. In the art of extracting oil from the meats of cocoanuts and the like, the process which comprises extracting the liquid contents from the meats, removing by centrifugation the small percentage of solid matter contained in the liquid extract, centrifugally separating the extract into a creamy emulsion and a heavier aqueous constituent, pasteurizing and cooling the cream, inoculating the cream with bacteria adapted to digest albumin and allowing it to stand, and centrifugally separating the dry oil from the water and albumin sludge.

8. In the art of extracting oil from the meats of cocoanuts and the like, the process which comprises subjecting the meats to pressure, thereby forming an edible pressed cake and a liquid extract, subjecting the extract to centrifugal force to separate the larger part of the water from the oil and albumin, pasteurizing and cooling the emulsion of oil and albumin, inoculating the emulsion with bacteria adapted to digest albumin and allowing it to stand, adding an alkali to neutralize organic acids, and subjecting the emulsion to centrifugal force to separate out dry oil.

9. The process of extracting oil from the meats of cocoanuts and the like which comprises subjecting the meats to pressure, thereby forming an edible pressed cake and a liquid extract, subjecting the extract to centrifugal force to remove from the extract the contained solid matters adapted to the manufacture of confectionery, applying centrifugal force to the liquid extract remaining to separate the larger part of the water from the oil and albumin, pasteurizing and cooling the emulsion of oil and albumin, inoculating the emulsion with bacteria adapted to digest albumin and allowing it to stand, adding an alkali to neutralize organic acids, and subjecting the emulsion to centrifugal force to separate out dry oil.

In testimony of which invention, I have hereunto set my hand, at city of New York, on this 15th day of October, 1918.

WALLACE ALEXANDER.

Witnesses:
GEORGE R. REMINGTON,
SAMUEL E. BARNES.